Apr. 17, 1923.
W. J. MILLER
1,451,707
PROCESS AND APPARATUS FOR FEEDING GLASS
Filed Jan. 7, 1921
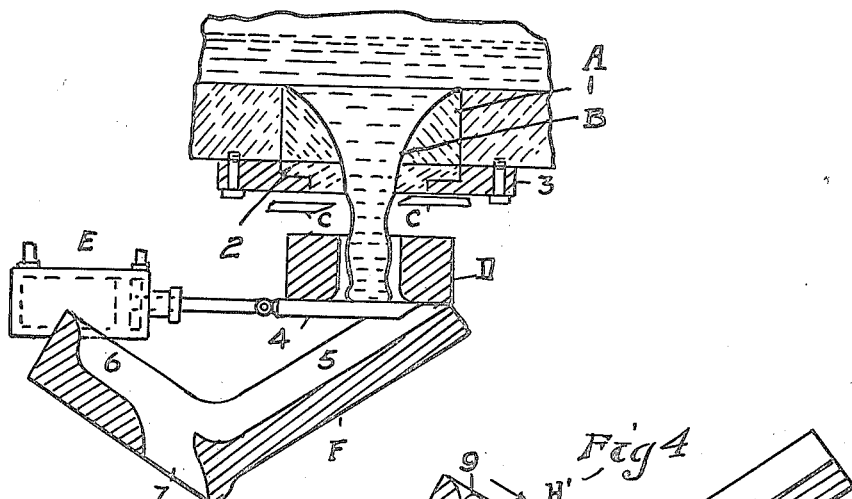
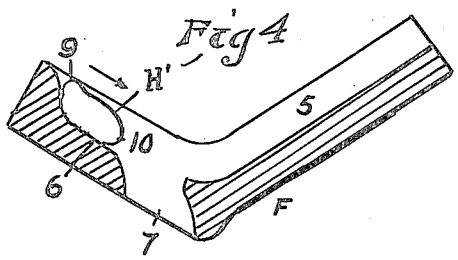
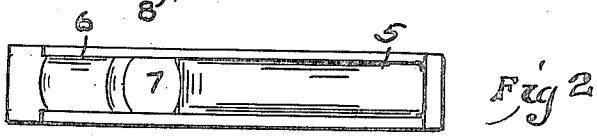
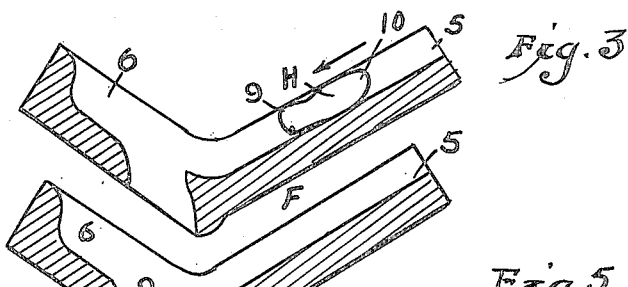
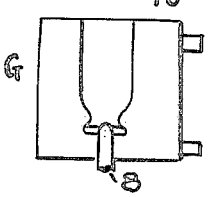

Patented Apr. 17, 1923.

1,451,707

UNITED STATES PATENT OFFICE.

WILLIAM J. MILLER, OF SWISSVALE, PENNSYLVANIA.

PROCESS AND APPARATUS FOR FEEDING GLASS.

Application filed January 7, 1921. Serial No. 435,668.

*To all whom it may concern:*

Be it known that I, WILLIAM J. MILLER, a citizen of the United States, and residing in the borough of Swissvale, in the county of Allegheny and State of Pennsylvania, have invented or discovered new, useful, and Improved Processes and Apparatus for Feeding Glass, of which the following is a specification.

My invention consists in a new and improved process and apparatus for feeding molten glass from the tank or other container to glass fabricating mechanism.

The present practice in the mechanical feeding of glass is to cause the same to protrude from the discharge orifice and to detach the protruding glass at proper intervals to form gathers which drop down or are conveyed to the fabricating mechanism. The detachment or severing of the glass whether accomplished by means of shears or other cutting members, or by breakage of the thinned neck or by any other method, results in a chilled and hardened end of the sheared or shortened stub which forms the lower end of the next gather when the latter is detached. The result is that the lower end of the gather is hardened and thus causes a scar in the fabricated article.

Furthermore, where a cup or receptacle is used to catch the stream of glass flowing from the discharge port, thereby building up a gob or gather which is then discharged from the cup, the contact of the glass with the bottom of the cup results in a chilled end in the gather.

Again, after a shearing operation, it is common practice to temporarily interrupt the stream of glass, while the molds are being shifted, by mechanical means, such, for instance, as holding the shears closed beneath the discharge orifice. This also results in producing a chilled and hardened end.

Thus, in such cases, the lower end of the gather is chilled and hardened, while the upper end is hot and in proper condition, for instance, to form the neck of a bottle.

It is usual in fabricating narrow mouth ware to form the parison in an inverted position; with the neck down. Therefore the chilled and hardened end of the gather is presented where the hot end should be.

In other forms of glass fabrication, as, for instance, the pressing of vault lights, it is desirable to present the chilled and hardened end of the gather to the forming element which engages the gather from above. In the present manner of feeding, however, the hot end of the gather is presented to the forming element.

The object I have in view is the proper presentation of the gather in the fabricating mechanism, so that its hot and chilled ends may be properly positioned.

I effect this object by reversing the gather, after it is detached, so that its hot end, instead of its chilled end, is presented below when the gather reaches the fabricating mechanism.

Thus in my improved method of feeding, the glass protruding or caused to protrude from the discharge orifice of the tank or other container for molten glass, is detached at proper intervals to form the gathers, and as the same fall down to or are conveyed to the fabricating mechanism, the gathers are reversed end for end to present their hot ends first to the molds.

For the accomplishment of this purpose I interpose between the discharge orifice and the fabricating mechanism means which are engaged by the detached gathers and which effect a reversal of the same.

In the accompanying drawings which are however merely intended to illustrate a practical embodiment of the principles of my invention, without limiting the scope of the latter to the construction shown, Fig. 1 is a diagrammatic view in vertical section, illustrating improved apparatus embodying the principles of my invention, the glass being shown flowing down out of the discharge orifice into a cup having a removable bottom, and below which is positioned the gather reversing device, and below which device is shown a parison mold; Fig. 2 is a plan view of the reversing device shown in Fig. 1; Fig. 3 is a longitudinal section of the same showing the gather detached and deposited by the receiving cup on said reversing device; Fig. 4 shows the gather moved to the other end of the device, and Fig. 5 is a similar view showing the gather reversed end for end and dropping down through the discharge port of the reversing device into the open top of the waiting mold.

The following is a detailed description of my invention as the same is illustrated in principle in the drawings.

A represents the boot or shallow extension of a glass tank, provided with a gravity flow discharge port B. Said port is shown provided with a bushing 1 having a downwardly tapering bore, and beneath said bushing a mouth ring 2 whose bore determines the thickness or diameter of the stream of glass flowing through the discharge orifice. Thus a mouth ring having the proper bore to produce the desired thickness of the stream, may be installed. 3 is a recessed metal ring attached to the underside of the boot A to support the mouth ring and bushing in place.

C represents a pair of coacting power driven shear blades mounted beneath the discharge orifice and adapted to shut together to sever the stream of glass. I have not shown in detail the construction of the shear blades and the actuating means therefor, as such mechanisms are old in the art and well known to those skilled in the latter.

D is a receiving cup or receptacle supported beneath the shears and in vertical alinement with the axis of the discharge port. Said cup is provided with automatic means for emptying it of its contents at proper intervals. Thus I have shown said cup provided with a slide bottom 4 which is opened and shut at proper intervals by any convenient means such as the fluid pressure cylinder and piston mechanism E.

Below the cup D, so as to receive its contents, when discharged, is the reversing device F shown as a body of suitable material provided with a pair of opposed slides or trough-like surfaces 5 and 6 converging at the bottom. 7 is the discharge port in the lower end of the surface 6. The trough-like surface 6 is preferably shorter than is 5.

G represents a mold, shown as a parison mold with an open top to receive the gather descending through the port 7, and shown provided at its lower end with the neck forming element or plunger 8.

The operation of the mechanical embodiment of the principles of my invention illustrated in the drawings is as follows.

The molten glass moves either by gravity or other impulse out through the discharge orifice B into the cup D, said flow continuing until the necessary amount of glass for the desired gather has passed below the shears C. The bottom of the cup is then opened to permit the built up gob to drop, thus stretching and thinning the neck of glass which connects the gob to the discharge orifice. The shears then close, cutting the attenuated neck, and chilling the glass directly beneath the discharge orifice so that it tends to temporarily interrupt the flow of glass down through said orifice.

The gather H drops down onto inclined surface 5 of the reversing device F. The bottom 4 of the cup D is then slid back into its closed position, and the shears having reopened, the flow of glass into the cup D is resumed.

The gather H slides down the relative steep incline 5, as shown in Fig. 3, with its chilled or hardened end 9, caused by the second previous shearing operation and also by contact with the bottom of the cup lowermost and its hot end 10 uppermost. The gather slides down the incline 5 and up the incline 6 to the end thereof, as shown at H' in Fig. 4 with the scarred and hardened end 9 uppermost. The gather now slides down the incline 6, with its hardened end 9 uppermost and its hot end 10 lowermost, and drops down through the port 7 as shown at H² in Fig. 5, to the waiting mold G, the hot end 10 being below and the cold end 9 at the top. The upper end of the surface 6 acts as a stop to reverse the movement of the gather.

It is evident that the gathers are thus automatically reversed, so that the chilled end does not interfere in any way with the manufacture of perfect ware.

There is a distinct advantage in the use of a cup to receive the glass as it discharges from the discharge orifice, as by properly timing the shearing operations and the emptying of the cup, the gathers may be accurately sized and proportioned as the work in hand may require. However, in the past the use of such cup has not been a success owing to the injurious result of presenting to the fabricating mechanism the chilled and hardened end of the gather, the result of the contact of the glass with and its piling up on the bottom of the cup. This trouble, which has always been characteristic of cup feeding, is entirely eliminated by my invention.

However, the usefulness of my invention is by no means confined to cup feeding, since the reversal of the gather is highly advantageous in connection with any method of feeding wherein the hardened end of the gather will not be properly positioned unless the gather is reversed, or wherein the reversal of the gather is desirable.

Although, for the sake of clearness of illustration I have minutely described the embodiment of the principles of my intion shown in the drawings, I do not wish to limit myself thereby, but claim broadly:—

1. The method of feeding molten glass from a container provided with a discharge orifice through which the glass is caused to protrude which consists in accumulating the protruding glass until the desired mass has been obtained, detaching said mass from the discharge orifice to form a gather, discharging the gather so formed, and reversing the gather, after the discharge, for the purpose described.

2. The method of feeding molten glass from a container provided with a discharge orifice through which the glass is caused to protrude which consists in accumulating the glass beneath the discharge orifice to form gathers, detaching said gathers from the glass protruding from said orifice, discharging said detached gathers, and reversing the gathers after they are discharged, for the purpose described.

3. In glass feeding, for use in connection with a container for molten glass provided with a discharge orifice through which the glass is caused to protrude, means for accumulating a mass of the protruding glass, means for severing said mass to form a gather, means for discharging said gather from said accumulating means, and means for reversing said gather after its said discharge, for the purpose described.

4. In glass feeding, for use in connection with a container for molten glass provided with a discharge orifice through which the glass is caused to protrude, the combination of a cup into which said protruding glass flows, means for severing the accumulated contents of said cup to form a gather, means for discharging the gather from said cup, and means for reversing said gather after its discharge, for the purpose described.

5. In glass feeding, for use in connection with a container for molten glass provided with a discharge orifice through which the glass is caused to protrude, the combination with a cup in which the protruded glass accumulates, means for severing the glass in said cup to form a gather, means for discharging the gather from the cup, and gather reversing means upon which said gather is discharged, for the purpose described.

6. In glass feeding, for use in connection with a container for molten glass provided with a discharge orifice through which the glass is caused to protrude, the combination with a cup in which the protruded glass accumulates, intermittently operated means for severing the glass in said cup to form gathers, means for discharging the gather from said cup, and gather reversing means upon which said gathers are discharged, for the purpose described.

7. A gather reversing device comprising a pair of opposed downwardly converging, inclined surfaces upon one of which surfaces the gathers are deposited, and the other surface being provided adjacent to the lower end with a discharge port, whereby the gathers slide down said first named surface and then up said second named surface and then down said second named surface and out through said port, for the purpose described.

8. A gather reversing device comprising a pair of trough-like inclines downwardly converging and upon one of which inclines the gathers are deposited, and the other incline being provided at its lower end with a discharge port, whereby the gathers slide down said first named incline and then up the second named incline and then down said second named incline and out through said port, for the purpose described.

Signed at Pittsburgh, Pa., this 4th day of January, 1921.

WILLIAM J. MILLER.